US009348446B1

(12) United States Patent
Barber et al.

(10) Patent No.: US 9,348,446 B1
(45) Date of Patent: May 24, 2016

(54) BEZEL FOR VEHICULAR TOUCHSCREEN DISPLAYS

(71) Applicant: Rockwell Collins, Inc., Cedar Rapids, IA (US)

(72) Inventors: Sarah Barber, Cedar Rapids, IA (US); David W. Jennings, Cedar Rapids, IA (US); Terry L. Olson, Cedar Rapids, IA (US); David A. Gribble, Cedar Rapids, IA (US); David L. Leedom, Center Point, IA (US); Daniel S. Skultety, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/315,029

(22) Filed: Jun. 25, 2014

(51) Int. Cl.
*G06F 3/041* (2006.01)

(52) U.S. Cl.
CPC ..................................... *G06F 3/041* (2013.01)

(58) Field of Classification Search
None
See application file for complete search history.

(56) References Cited

U.S. PATENT DOCUMENTS

2012/0105335 A1* 5/2012 Suddreth et al. ............... 345/173
2012/0127115 A1* 5/2012 Gannon ........................ 345/174

OTHER PUBLICATIONS

U.S. Department of Transportation, Federal Aviation Administration, Advisory Circular, Controls for Flight Deck Systems, Dec. 8, 2011, 30 pages.
Garmin, GTN 750 Flier, Printed online at http://sites.garmin.com/gtn/assets/GTNLifeSizePDF.pdf, 3 pages, Print Date Jun. 18, 2014.
Garmin, G3000™ Flier, Printed online at https://buy.garmin.com/en-CA/CA/in-the-air/flight-decks/g3000-/prod66916.html#gallery-dialog, 2 pages, Print Date Jun. 18, 2014.

\* cited by examiner

*Primary Examiner* — David D Davis
(74) *Attorney, Agent, or Firm* — Angel N. Gerdzhikov; Donna P. Suchy; Daniel M. Barbieri

(57) ABSTRACT

An apparatus and system for a vehicular touchscreen system. The apparatus includes a bezel configured to surround a touchscreen of a vehicular touchscreen device. The bezel includes an outwardly extending bezel portion. The outwardly extending bezel portion extends outwardly in a direction at least partially having a component direction perpendicular to a surface of the touchscreen.

14 Claims, 7 Drawing Sheets

BEZEL FOR VEHICULAR TOUCHSCREEN DISPLAYS

FIELD OF THE INVENTION

Embodiments of the invention are directed generally toward a hand-stabilizing bezel for a vehicular touchscreen display.

BACKGROUND

Currently, bezels used on touchscreen displays are typically flat and surround the display surface as shown in FIG. 1. In a non-movement environment (e.g., non-turbulent environment or non-shaking environment), such bezels may be sufficient for usability of the touchscreen; in such a non-movement environment, a user will typically only need to use one finger to operate the display. In a movement environment, however, and in particular during in-flight turbulence or while driving on a poorly paved road, on an unpaved road, or off-road, it can be very difficult to operate a touchscreen without providing some additional "anchoring" for the hand and palm, so that finger movement can be precise in turbulent or rough conditions. For example, during medium to severe turbulence, the user's arm can be subject to significant motion as a result of the turbulence, such that the user may not able to consistently and successfully operate the touchscreen.

An additional problem with currently implemented touchscreens is that currently implemented touchscreens offer inadequate tactile feedback for determining finger position and motion during vehicle movement; such inadequate tactile feedback reduces the positional accuracy of touches on a touchscreen display.

Therefore, it would be desirable to provide an apparatus and system configured to improve hand stability while operating a touchscreen display during movement situations and configured to increase the positional accuracy of user touches on a touchscreen display.

SUMMARY

Accordingly, an embodiment includes an apparatus for a vehicular touchscreen system. The apparatus includes a bezel configured to surround a touchscreen of a vehicular touchscreen device. The bezel includes an outwardly extending bezel portion. The outwardly extending bezel portion extends outwardly in a direction at least partially having a component direction perpendicular to a surface of the touchscreen.

A further embodiment includes a removable bezel system for a vehicular touchscreen device. The removable bezel system includes a bezel base portion configured to attach to a touchscreen device. The removable bezel system further includes a removable bezel portion configured to surround a touchscreen of the touchscreen device. The removable bezel portion is configured to attach to and be removed from the bezel base portion.

Additional embodiments are described in the application including the claims. It is to be understood that both the foregoing general description and the following detailed description are exemplary and explanatory only and are not restrictive. Other embodiments of the invention will become apparent.

BRIEF DESCRIPTION OF THE FIGURES

Other embodiments of the invention will become apparent by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications, and equivalents are encompassed. For the purpose of clarity, technical material that is known in the technical fields related to the embodiments has not been described in detail to avoid unnecessarily obscuring the description.

Some embodiments of the invention include a bezel, a removable bezel, a touchscreen device including a bezel, or a touchscreen device including a removable bezel. Embodiments of the invention include an apparatus, system, and device configured to provide a suitable palm or finger support for a user such that the user may operate a touchscreen more precisely in a movement environment. Additionally, some embodiments are configured to increase the positional accuracy of user touches on a touchscreen. A movement environment may include a vehicle (e.g., an aircraft, an automobile, or the like) that is operating subject to turbulence or rough conditions.

Figure 1:
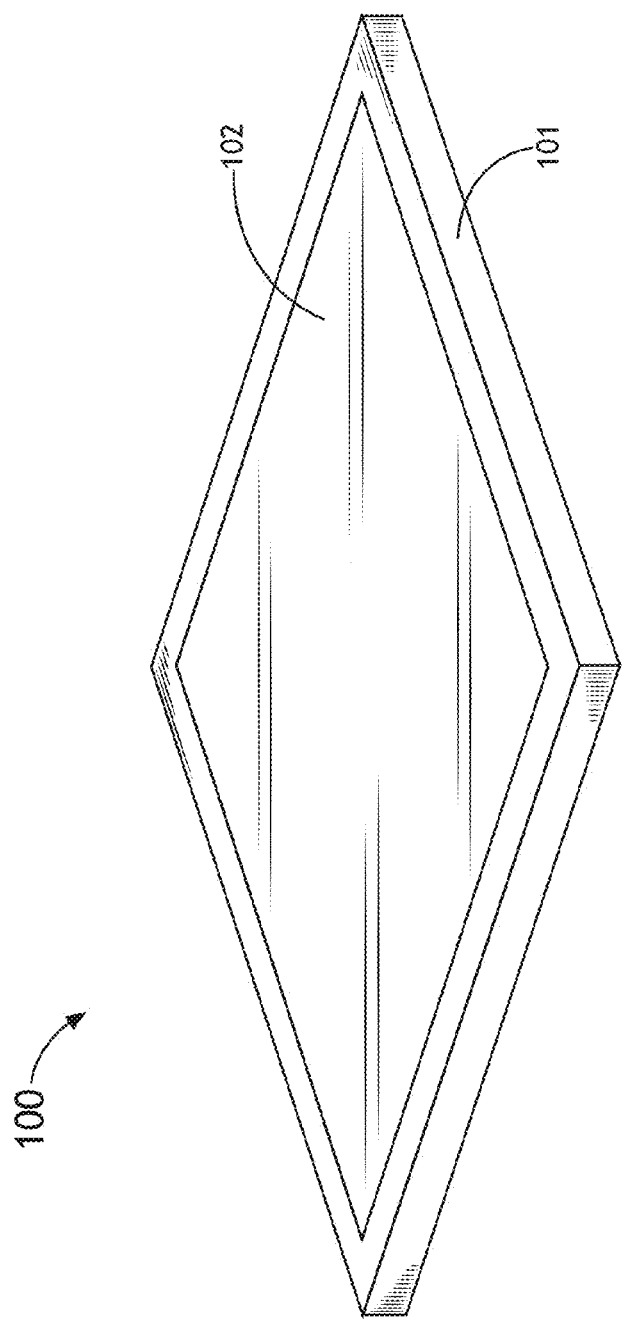
FIG. 1 shows a currently implemented touchscreen display having a currently implemented bezel.

Referring now to FIG. 1, a currently implemented touchscreen device 100 with a currently implemented bezel 101 surrounding the touchscreen 102 is depicted. The bezel of 101 of a currently implemented touchscreen device 100 is typically flat and fails to provide stabilizing support to a user in a movement environment.

Figure 2:
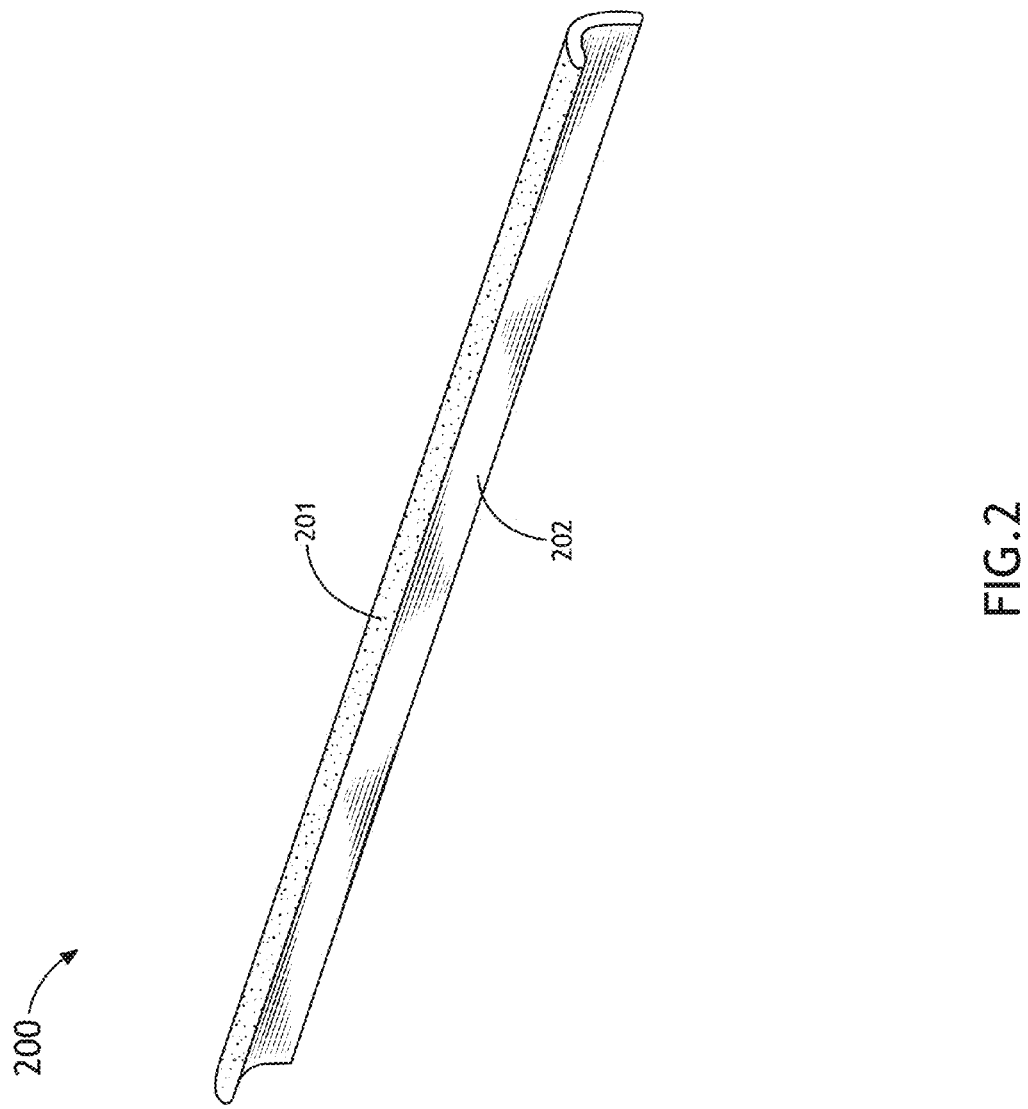
FIG. 2 depicts an exemplary bezel of some embodiments.
Figure 3:
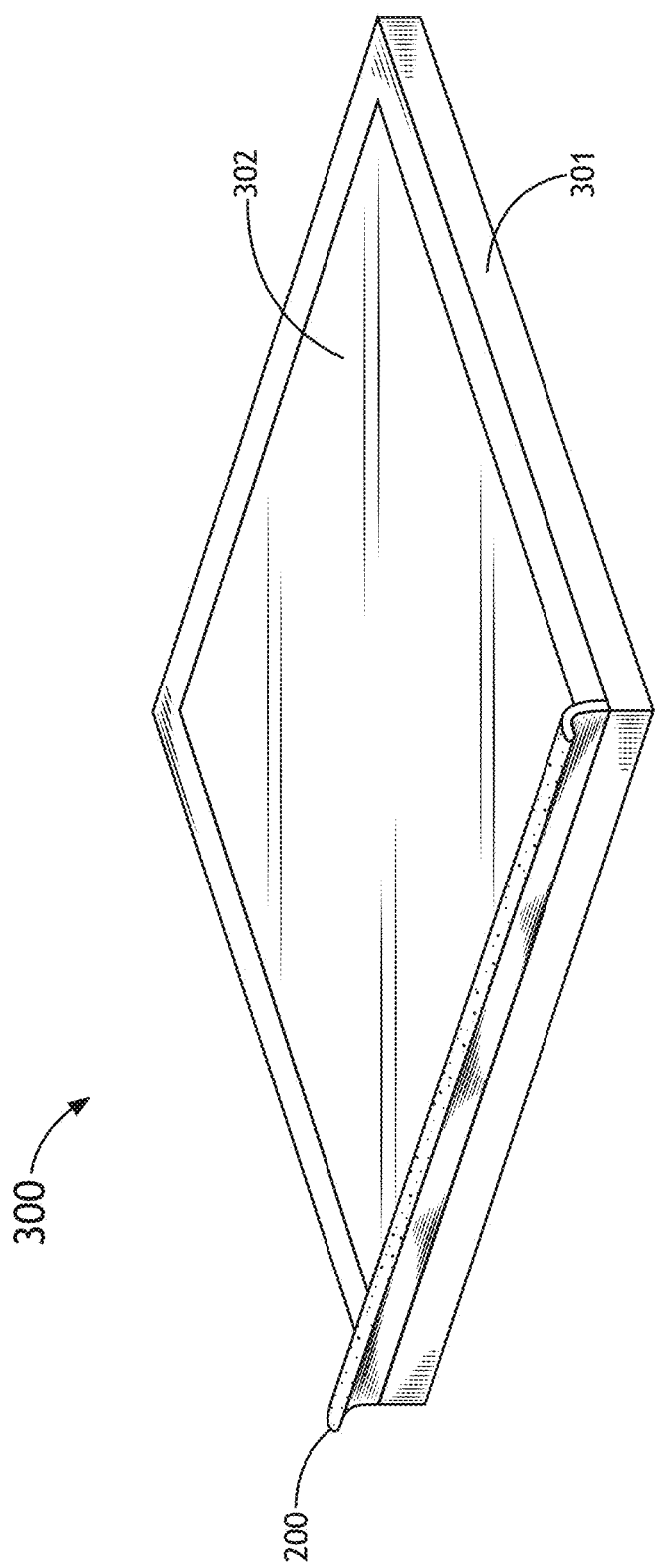
FIG. 3 shows an exemplary touchscreen display device including an exemplary bezel of some embodiments.

Referring now to FIGS. 2 and 3, an exemplary bezel 200 and an exemplary touchscreen display device 300 having the exemplary bezel of some embodiments are depicted. The bezel 200 may be attached to or implemented as part of a touchscreen device 300. The bezel 200 may provide a suitable palm rest or finger support to aid the user in operating the touchscreen device 300 precisely in a movement environment. For example, the bezel 200 may be configured to or may extend outwardly away from the touchscreen 302 of the touchscreen device 300. For example, in some embodiments, the bezel 200 extends outwardly (e.g., in a direction perpendicular to a plane of the touchscreen 302 or in a direction having directional components perpendicular to a plane of the touchscreen 302 and parallel to the plane of the touchscreen 302) at least 0.25 inches (e.g., 0.25 inches, 0.5 inches, 0.75 inches, 1 inch, 1.5 inches, 2 inches, 3 inches, 4 inches, or more). In some embodiments, the bezel 200 or the touchscreen device 300 includes one or more flat bezel portions 301 around one or more edges of the touchscreen 302. The bezel 200 may be comprised of any suitable material or combinations of materials, such as one or some combination of metal (e.g., aluminum, steel, or the like), plastic (e.g., polycarbonate, polypropylene, acrylic, or the like), fiberglass, carbon fiber, wood, or the like. In such embodiments, where the bezel is comprised of a polycarbonate plastic, the polycarbonate plastic may exemplarily comprise Sabic Lexan Resin 950. Further, in some embodiments, the bezel 200 may be coated with a suitable coating for texture and aesthetic purposes; for example, the bezel 200 may be coated with a clear polyurethane coating to provide a reflectively user friendly, flat appearance.

In exemplary embodiments, the bezel 200 may include one surface (e.g., a curved surface or a multi-curved surface) or a plurality of surfaces (e.g., a plurality of or some combination of planar surfaces, curved surfaces, or multi-curved surfaces). In embodiments where the bezel includes one surface, the single surface may comprise a single curved surface or a multi-curved surface. For example, a single curved surface may comprise a curvilinear surface having a curved cross-section (e.g., circular, elliptical, flared elliptical, or the like), where the curved cross-section extends linearly parallel to an edge of the touchscreen 302 of the touchscreen device 300. Additionally, for example, a multi-curved curved surface may comprise a surface having a curved cross-section (e.g., circular, elliptical, flared elliptical, or the like) which varies (e.g., in dimension or shape) along a direction parallel to an edge of the touchscreen 302 of the touchscreen device 300. As shown by the exemplary embodiments depicted in FIGS. 2 and 3, the bezel 200 includes an upper curved surface 201 and a lower curved surface 202. The upper curved surface 201 may provide a suitable palm or finger rest for the user to operate the touchscreen. For example, during flight the upper curved surface 201 may function as palm rest suitable for providing support and stability during turbulence; the upper curved surface 201 allows the user to anchor his or her hand by applying downward pressure on the upper curved surface 201 of the bezel 200. The upper curved surface 201 also allows the user to keep his or her palm slightly raised, which reduces any tendency for the palm (or other unintended portions of the hand) to touch the screen during turbulence. Additionally, the lower curved surface 202 may provide additional anchoring capabilities by allowing a user's thumb and/or other finger to grip around the lower curved surface 202 so as to anchor a palm or hand in a stationary position relative to a touchscreen 302.

In some embodiments, one or more of the surfaces (e.g., 201, 202) of the bezel 200 may be covered in a slip-resistant material (e.g., rubber, neoprene, plastic, silicon, leather, or the like) or include a slip-resistant surface texture (e.g., grooves, a porous surface, a roughed-up surface, a sanded surface, indentations, dimples, bumps, raised ridges, or the like). In further embodiments, one, some, or all of the surfaces (e.g., 201, 202) of the bezel 200 are smooth. For example, as shown in FIG. 2, the upper curved surface 201 is covered in a slip-resistant material or includes a slip-resistant surface texture while the lower curved surface 202 is smooth.

In some embodiments, one or more of the surfaces (e.g., 201, 202) of the bezel 200 may include one or more touch-recognizable features. The one or more touch-recognizable features comprise exterior materials (e.g., metal, rubber, neoprene, plastic, silicon, leather, or the like) and/or include a surface texture (e.g., grooves, a smooth surface, a porous surface, a roughed-up surface, a sanded surface, indentations, dimples, bumps, raised ridges, or the like). In some embodiments, the one or more touch-recognizable features may comprise unique or semi-unique touch-recognizable features located along the bezel 200 such that a particular touch-recognizable feature is configured to indicate to a user a particular position of the user's hand along the bezel 200 based on tactile characteristics (e.g., texture, spacing of texture sensible features, type of material, or the like) of the particular touch-recognizable feature. The one or more touch-recognizable features may be implemented as one or more different exterior materials (e.g., metal, plastic, rubber, silicon, leather, or the like) and/or one or more different surface textures (e.g., grooves, a smooth surface, a porous surface, a roughed-up surface, a sanded surface, indentations, dimples, bumps, raised ridges, or the like).

Figure 4:
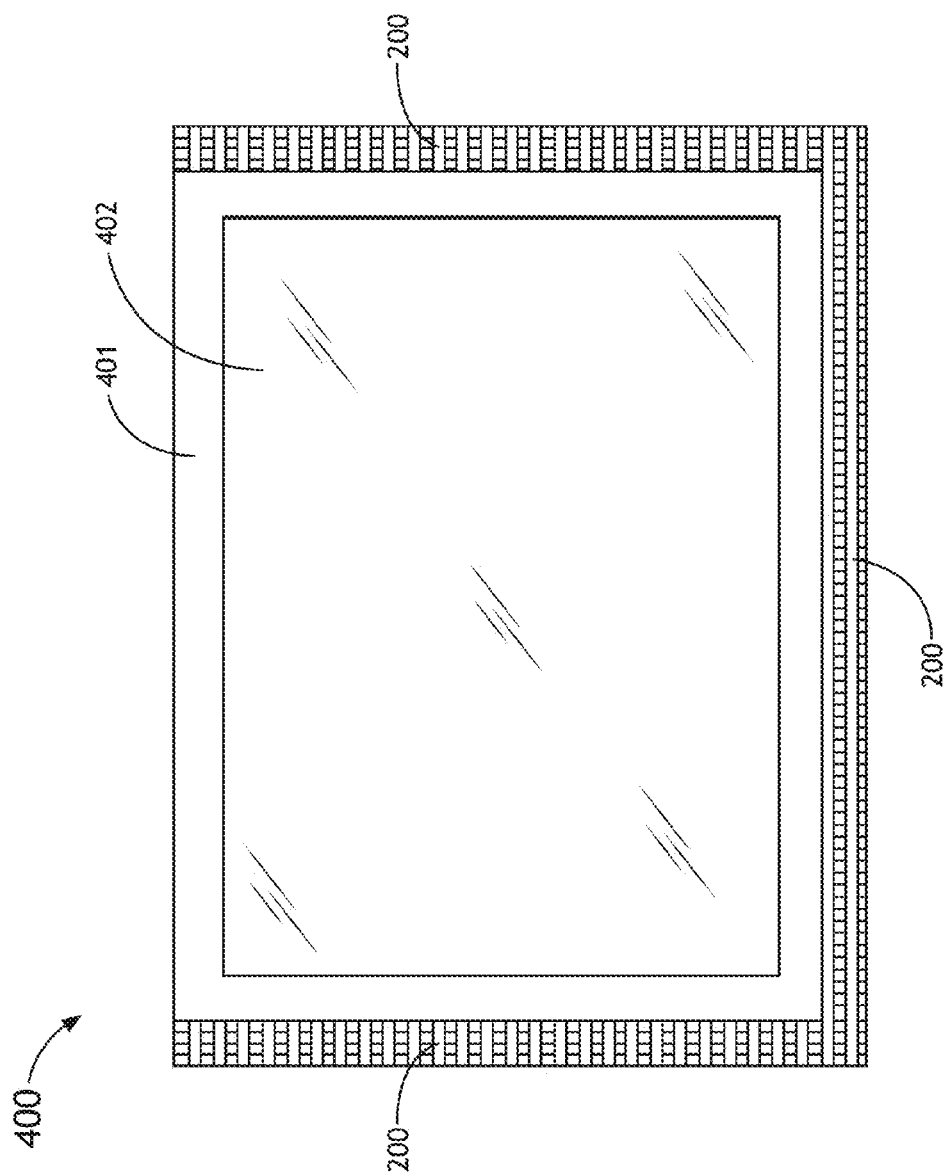
FIG. 4 shows a further exemplary touchscreen display device including an exemplary bezel on three sides as contemplated in some embodiments.

Referring now to FIG. 4, a further exemplary touchscreen display device including an exemplary bezel on three sides of some embodiments is depicted. Some embodiments include a plurality of outwardly extending bezels portions 200 attached to or implemented as part of a touchscreen device 400. For example, the touchscreen device 400 may include an outwardly extending bezel portion 200 along a bottom edge of a touchscreen 402 and outwardly extending bezel portions 200 along the side edges of the touchscreen 402. Some embodiments further include an outwardly extending bezel portion 200 along a top edge of a touchscreen 402. In a further exemplary embodiment, a touchscreen device may include an outwardly extending bezel 200 portion along a bottom edge of a touchscreen 402 and only one other outwardly extending bezel portion along only one of the side edges of the touchscreen 402. In some embodiments, the bezel 200 or the touchscreen device 400 includes one or more flat bezel portions 401 around one or more edges of the touchscreen 402.

Figure 5:
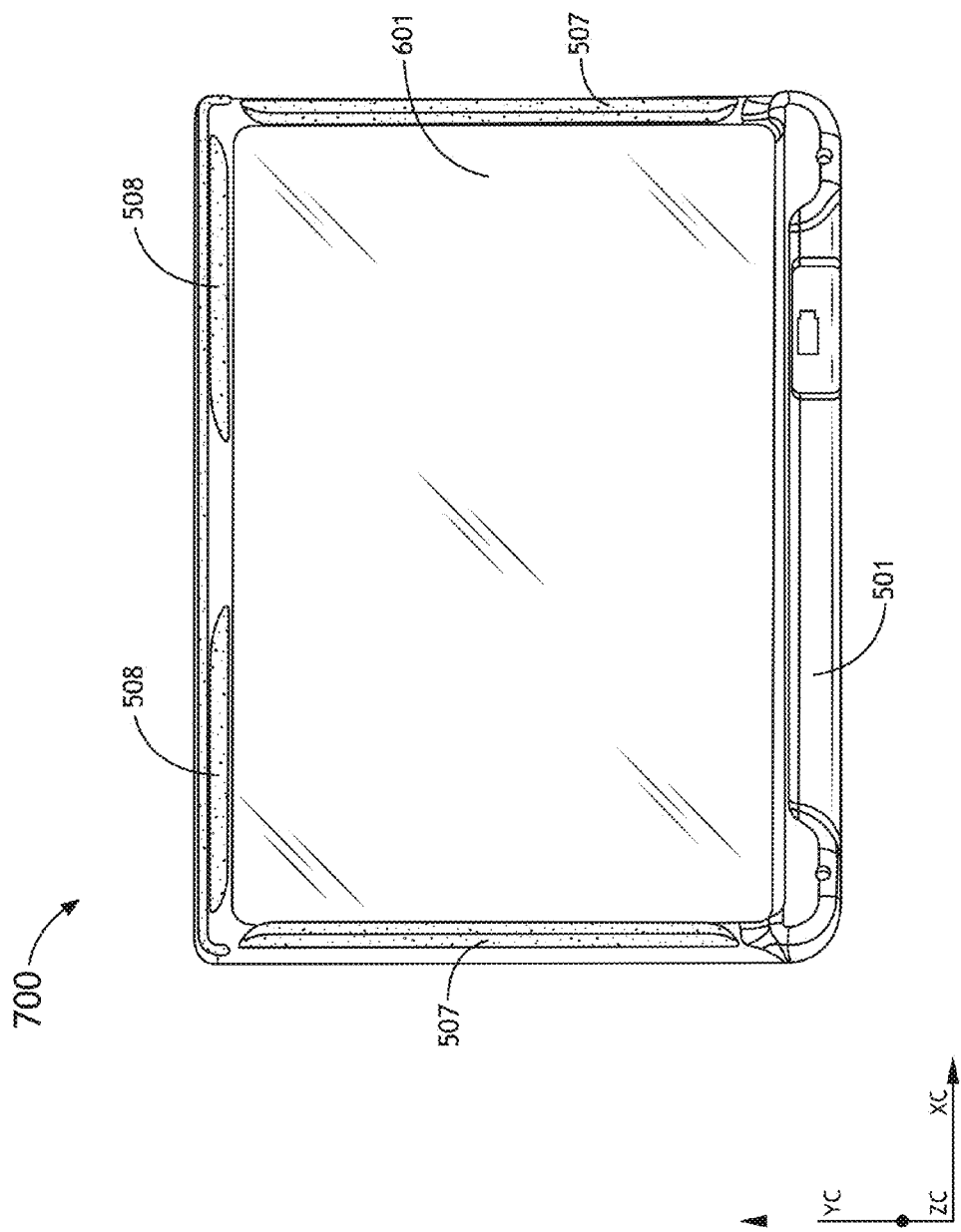
FIG. 5 shows an additional exemplary touchscreen display device including an exemplary removable bezel as contemplated in additional embodiments.
Figure 6:
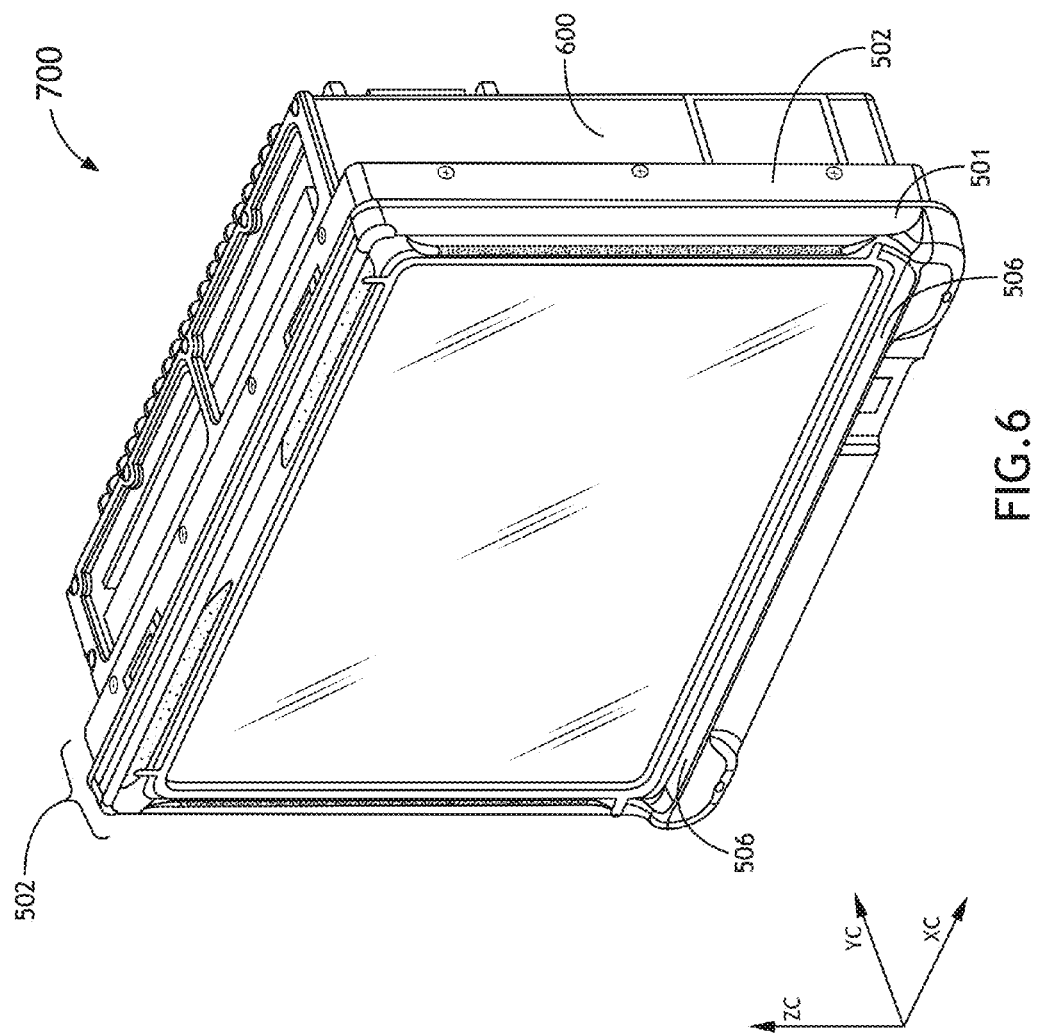
FIG. 6 shows an isometric view of the further exemplary touchscreen display device including the exemplary removable bezel as contemplated in additional embodiments.
Figure 7:
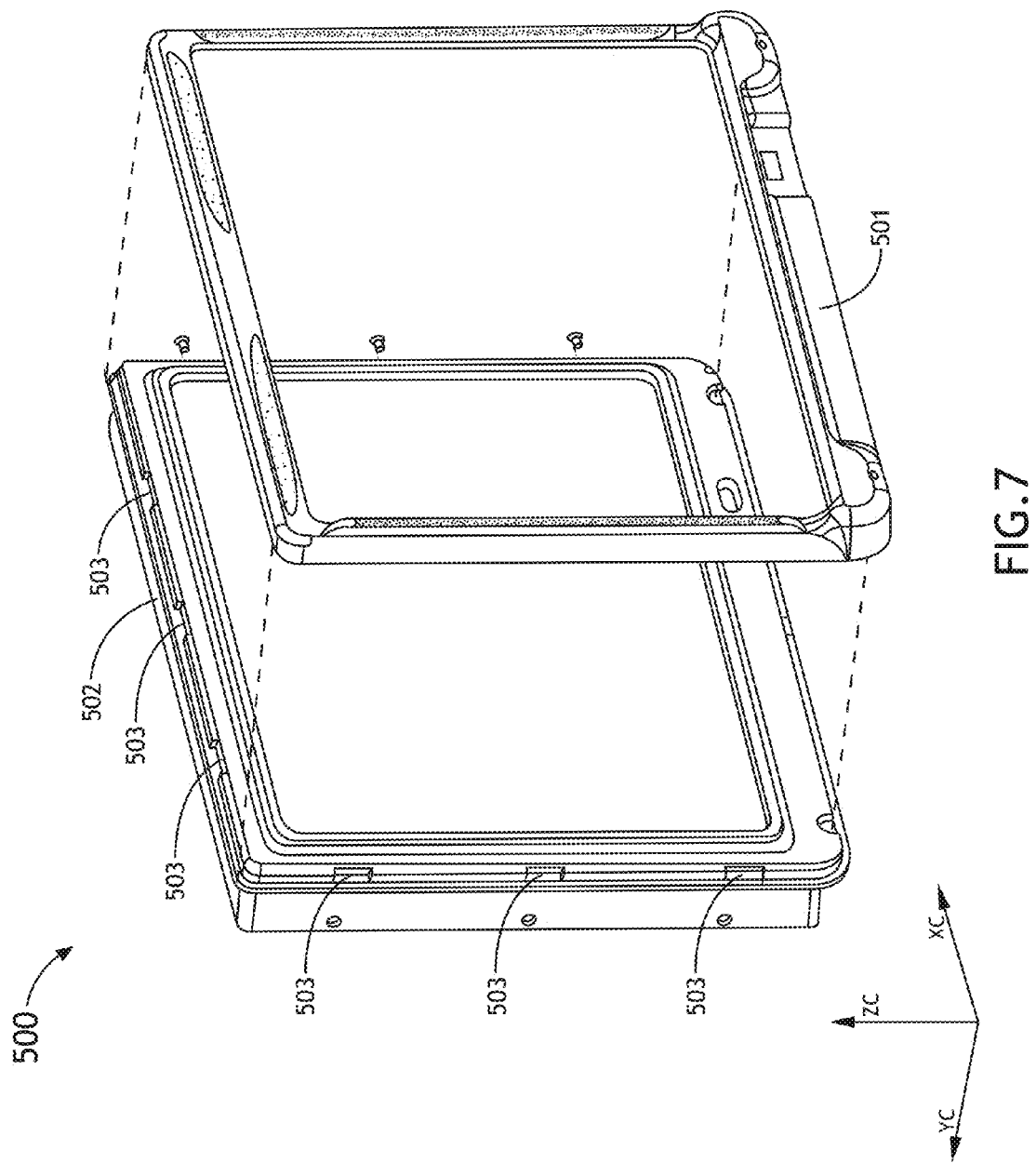
FIG. 7 shows an exploded view of the further exemplary touchscreen display device including the exemplary removable bezel as contemplated in additional embodiments.

Referring now to FIGS. 5-7, an exemplary touchscreen system 700, which includes an exemplary touchscreen device 600 and an exemplary removable bezel system 500 of additional embodiments is depicted. In some embodiments, the touchscreen system 700 may be implemented as part of a touchscreen system of an aircraft or flight simulator, while in other embodiments the exemplary system may be implemented as a touchscreen system in another setting (such as other vehicular touchscreen systems). In exemplary embodiments, the removable bezel system 500 of the touchscreen system 700 is configured to stabilize a pilot's hand so as to improve touch input accuracy during flight turbulence.

In some embodiments, the removable bezel system 500 includes a bezel base portion 502 and a removable bezel portion 501.

In some embodiments, the bezel base portion 502 of the removable bezel system 500 may be configured to attach by attachment means (such as fasteners, screws, nuts and bolts, welds, pins, rivets, clips, or the like) to the touchscreen device 600. In other embodiments, the bezel base portion 502 may be implemented as part of the touchscreen device 600; for example, the bezel base portion may include the touchscreen portion which is attachable to the back-end electronics of the touchscreen device 600.

In some embodiments, the removable bezel portion 501 is configured to removably attach to the bezel base portion 502 by attachment means 503. In some embodiments, the attachment means 503 comprises one or more snap mechanisms, one or more clip mechanisms, one or more button mechanisms, one or more latch mechanisms, one or more clasp mechanisms, hook and loop fabric, or the like.

In some embodiments, the removable bezel portion 501 may include a support shelf 506, bezel side features 507, and/or bezel top features 508.

In some embodiments, the support shelf 506 may include one or more slip-resistant features and/or one or more touch-recognizable features. The support shelf 506 may be configured to support or stabilize a user's hand. The one or more slip-resistant features may include an exterior slip-resistant material (e.g., rubber, neoprene, plastic, silicon, leather, or the like) or a slip-resistant surface texture (e.g., grooves, a porous surface, a roughed-up surface, a sanded surface, indentations, dimples, bumps, raised ridges, or the like). In some embodiments, the one or more touch-recognizable features may comprise unique or semi-unique touch-recognizable features located along the support shelf 506 such that a particular touch-recognizable feature is configured to indicate to a user a particular position of the user's hand along the support shelf 506 based on tactile characteristics (e.g., texture, spacing of texture sensible features, type of material, or the like) of the particular touch-recognizable feature. The one or more touch recognizable features may be implemented as one or more different exterior materials (e.g., metal, plastic, rubber, silicon, leather, or the like) and/or one or more different surface textures (e.g., grooves, a smooth surface, a porous surface, a roughed-up surface, a sanded surface, indentations, dimples, bumps, raised ridges, or the like). In some exemplary embodiments, the support shelf 506 includes one, a plurality, or some combination of at least one finger groove and/or at least one finger ridge.

In some embodiments, the bezel side features 507 may include one or more slip-resistant features and/or one or more touch-recognizable features. The bezel side features 507 may be configured to support or stabilize a user's hand. The one or more slip-resistant features may include an exterior slip-resistant material (e.g., rubber, neoprene, plastic, silicon, leather, or the like) or a slip-resistant surface texture (e.g., grooves, a porous surface, a roughed-up surface, a sanded surface, indentations, dimples, bumps, raised ridges, or the like). In some embodiments, the one or more touch-recognizable features may comprise unique or semi-unique touch-recognizable features located along a side of the removable bezel 501 such that a particular touch-recognizable feature is configured to indicate to a user a particular position of the user's hand along the side of the removable bezel 501 based on tactile characteristics (e.g., texture, spacing of texture sensible features, type of material, or the like) of the particular touch-recognizable feature. The one or more touch recognizable features may be implemented as one or more different exterior materials (e.g., metal, plastic, rubber, silicon, leather, or the like) and/or one or more different surface textures (e.g., grooves, a smooth surface, a porous surface, a roughed-up surface, a sanded surface, indentations, dimples, bumps, raised ridges, or the like). In some exemplary embodiments, the bezel side features 507 include one, a plurality, or some combination of at least one finger groove and/or at least one finger ridge.

In some embodiments, the bezel top features 508 may include one or more slip-resistant features and/or one or more touch-recognizable features. The bezel top features 508 may be configured to support or stabilize a user's hand. The one or more slip-resistant features may include an exterior slip-resistant material (e.g., rubber, neoprene, plastic, silicon, leather, or the like) or a slip-resistant surface texture (e.g., grooves, a porous surface, a roughed-up surface, a sanded surface, indentations, dimples, bumps, raised ridges, or the like). In some embodiments, the one or more touch-recognizable features may comprise unique or semi-unique touch-recognizable features located along a top of the removable bezel 501 such that a particular touch-recognizable feature is configured to indicate to a user a particular position of the user's hand along the top of the removable bezel 501 based on tactile characteristics (e.g., texture, spacing of texture sensible features, type of material, or the like) of the particular touch-recognizable feature. The one or more touch recognizable features may be implemented as one or more different exterior materials (e.g., metal, plastic, rubber, silicon, leather, or the like) and/or one or more different surface textures (e.g., grooves, a smooth surface, a porous surface, a roughed-up surface, a sanded surface, indentations, dimples, bumps, raised ridges, or the like). In some exemplary embodiments, the bezel top features 508 include one, a plurality, or some combination of at least one finger groove or at least one finger ridge.

Additionally, in particular embodiments, the removable bezel portion 501 may include one or more (e.g., one, two, three, or four) outwardly extending bezel portions 200 (as disclosed with reference to FIGS. 2-4, above).

In exemplary embodiments, the removable bezel portion 501 may be removed if damaged and replaced without disassembly of the unit. Additionally, the removable bezel portion 501 may be customized for different customers and/or different operators (e.g., pilots or drivers) to incorporate customized shapes, customized textures, customized materials, customized hand-support configurations, customized colors, or the like.

The removable bezel system 500 may be comprised of any suitable material or combinations of materials, such as one or some combination of metal (e.g., aluminum, steel, or the like), plastic (e.g., polycarbonate, polypropylene, acrylic, or the like), fiberglass, carbon fiber, wood, or the like. In exemplary embodiments, the removable bezel system 500 may be comprised of an injection molded polycarbonate plastic, and the polycarbonate plastic may exemplarily comprise Sabic Lexan Resin 950. One benefit of an injection molded plastic is that the removable bezel system 500 (or the removable bezel 501) has consistent color all the way through the material to improve the aesthetic durability and to remove the need to repaint any surfaces after repeated hand contact. Further, in some embodiments, the removable bezel system 500 may be coated with a suitable coating for texture and aesthetic purposes; for example, the removable bezel system 500 may be coated with a clear polyurethane coating to provide a reflectively user friendly, flat appearance.

It is believed that embodiments of the present invention and many of its attendant advantages will be understood by the foregoing description, and it will be apparent that various changes can be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An apparatus for a vehicular touchscreen system, comprising:
   a bezel configured to surround a touchscreen of a vehicular touchscreen device,
   wherein the bezel includes:
   at least one outwardly extending bezel portion, wherein the at least one outwardly extending bezel portion extends outwardly in a direction at least partially having a component direction perpendicular to a surface of the touchscreen, a particular outwardly extending bezel portion of the at least one outwardly extending bezel portion having a curved cross-section wherein the curved cross-section extends at least partially linearly parallel to a surface of the vehicular touchscreen device, the particular outwardly extending bezel portion including a first curved surface and a second curved surface, the first curved surface having a slip-resistant texture or being covered in a slip-resistant material, the second curved surface being smooth.

2. The apparatus of claim 1, further comprising a flat bezel portion along a top of touchscreen of the vehicular touchscreen device, wherein the at least one outwardly extending bezel portion is three outwardly extending bezel portions including the particular outwardly extending bezel portion along a bottom of the touchscreen of the vehicular touchscreen device, a second outwardly extending bezel portion along a first side of the touchscreen of the vehicular touchscreen device, and a third outwardly extending bezel portion along a second side of the touchscreen of the vehicular touchscreen device, the second outwardly extending bezel portion having a curved cross-section extending at least partially linearly parallel to the surface of the vehicular touchscreen device, the second outwardly extending bezel portion including a first curved surface and a second curved surface, the first curved surface of the second outwardly extending bezel portion having a slip-resistant texture or being covered in a slip-resistant material, the second curved surface of the second outwardly extending bezel portion being smooth, the third outwardly extending bezel portion having a curved cross-section extending at least partially linearly parallel to the surface of the vehicular touchscreen device, the third outwardly extending bezel portion including a first curved surface and a second curved surface, the first curved surface of the third outwardly extending bezel portion having a slip-resistant texture or being covered in a slip-resistant material, the second curved surface of the third outwardly extending bezel portion being smooth.

3. The apparatus of claim 1, wherein the at least one outwardly extending bezel portion extends outwardly at least 0.5 inches in a direction at least partially having a component direction perpendicular to the surface of the touchscreen.

4. The apparatus of claim 1, wherein the at least one outwardly extending bezel portion extends outwardly at least 0.25 inches in a direction at least partially having a component direction perpendicular to the surface of the touchscreen.

5. The apparatus of claim 1, wherein the first curved surface of the particular outwardly extending bezel portion has a plurality of touch-recognizable features.

6. The apparatus of claim 1, wherein the bezel is removable.

7. A removable bezel system for a touchscreen device, comprising:
a bezel base portion configured to attach to a touchscreen device; and
a removable bezel portion configured to surround a touchscreen of the touchscreen device, wherein the removable bezel portion is configured to attach to and be removed from the bezel base portion via attachment means,
wherein the removable bezel portion includes:
a support shelf configured to support or stabilize a user's hand;
bezel side features including at least one first bezel side feature and at least one second bezel side feature, the at least one first bezel side feature including at least one touch-recognizable bezel side feature, each of the at least one touch-recognizable bezel side feature including an external material different from another portion of the bezel or a surface texture different from another portion of the bezel; and
at least one outwardly extending bezel portion, wherein the at least one outwardly extending bezel portion extends outwardly in a direction at least partially having a component direction perpendicular to a surface of the touchscreen device, a particular outwardly extending bezel portion of the at least one outwardly extending bezel portion having a curved cross-section wherein the curved cross-section extends at least partially linearly parallel to a surface of the touchscreen device, the particular outwardly extending bezel portion including a first curved surface and a second curved surface, the first curved surface having a slip-resistant texture or being covered in a slip-resistant material, the second curved surface being smooth.

8. The removable bezel system of claim 7, wherein the support shelf includes one or more slip-resistant features.

9. The removable bezel system of claim 7, wherein the support shelf includes one or more touch-recognizable features.

10. The removable bezel system of claim 7, wherein the removable bezel portion includes bezel top features configured to stabilize a position of a user's hand relative to the touchscreen in a movement environment.

11. The removable bezel system of claim 10, wherein the bezel side features include one or more slip-resistant features and at least one of a finger groove or a finger ridge.

12. A system, comprising:
a touchscreen device; and
a bezel, wherein the bezel includes:
a bezel base portion configure to attach to the touchscreen device; and
a removable bezel portion configured to surround a touchscreen of the touchscreen device, wherein the removable bezel portion is configured to attach to and be removed from the bezel base portion via attachment means, wherein the removable bezel portion includes:
a support shelf configured to support or stabilize a user's hand;
bezel side features including at least one first bezel side feature and at least one second bezel side feature, the at least one first bezel side feature including at least one touch-recognizable bezel side feature, each of the at least one touch-recognizable bezel side feature including an external material different from another portion of the bezel or a surface texture different from another portion of the bezel; and
at least one outwardly extending bezel portion, wherein the at least one outwardly extending bezel portion extends outwardly in a direction at least partially having a component direction perpendicular to a surface of the touchscreen device, a particular outwardly extending bezel portion of the at least one outwardly extending bezel portion having a curved cross-section wherein the curved cross-section extends at least partially linearly parallel to a surface of the touchscreen device, the particular outwardly extending bezel portion including a first curved surface and a second curved surface, the first curved surface having a slip-resistant texture or being covered in a slip-resistant material, the second curved surface being smooth.

13. The system of claim 12, wherein the removable bezel portion further includes:
at least two bezel top features including at least two touch-recognizable top bezel features spaced apart, the at least two touch-recognizable top bezel features configured to indicate a position of a user's hand to a user.

14. The system of claim 12, wherein the at least one second bezel side feature includes at least one slip-resistant side bezel feature.

\* \* \* \* \*